E. L. V. UHLENHUTH.
BELT FASTENER.
APPLICATION FILED SEPT. 8, 1910.

991,395.

Patented May 2, 1911.

Witnesses:

Inventor:
Egide Louis Victor Uhlenhuth
Attorney.

UNITED STATES PATENT OFFICE.

EGIDE LOUIS VICTOR UHLENHUTH, OF PARIS, FRANCE.

BELT-FASTENER.

991,395.　　　　Specification of Letters Patent.　　Patented May 2, 1911.

Application filed September 8, 1910. Serial No. 581,027.

*To all whom it may concern:*

Be it known that I, EGIDE LOUIS VICTOR UHLENHUTH, a citizen of the French Republic, and resident of Paris, France, have invented certain new and useful Improvements in Belt-Fasteners, of which the following is a specification.

This invention relates to a fastener for joints of driving and other belts, which is very light, very supple, very cheap and allows the easy and rapid connection of the ends of the belts.

Figure 1:
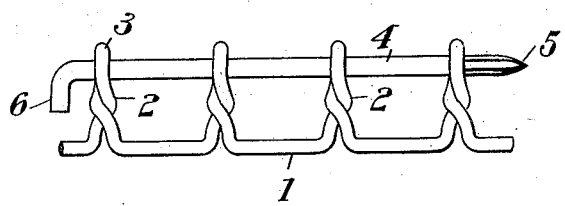
Figure 2:
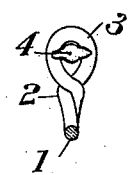
Figure 3:
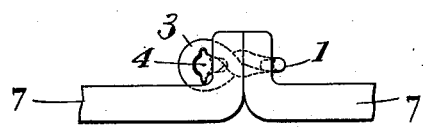
Figure 4:
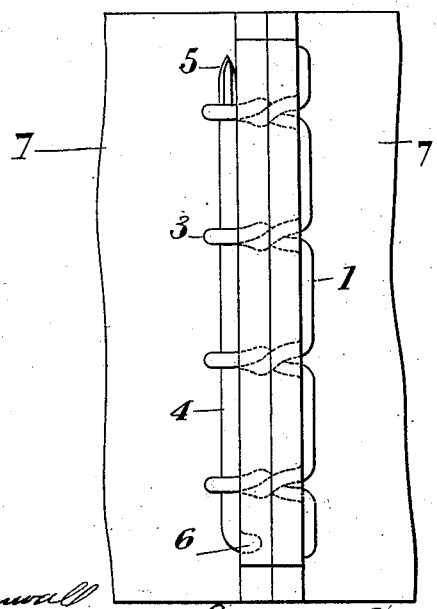

In the accompanying drawings:—Figure 1 shows a belt fastener in top plan view; Fig. 2 shows the same viewed from its end; Fig. 3 shows a fastener mounted on a belt after the ends of the latter (elevation view) have been joined together; Fig. 4 is a plan view illustrating the application of the belt fastener.

The fasteners made according to the principles of the present invention are very resisting, they hold the two parts of the belt in a united condition, without any deviation during the function of the belt. They do not produce shocks when passing over the pulleys; their great lightness renders them especially suitable for high speeds avoiding the balancing of the belts as well as the shocks; they pass very well in the belt shifting forks; they cannot wear out in contact with the cast iron of the pulleys and consequently their life is a long one. Their great resistance to tensile strain renders them very good for slowly running belts or for belts subjected to great strains; they do not give out nor do they tear away the belts whether they be of leather or woven or made of any other material.

These belt fasteners are put in position very easily by most simple means. They are taken off with the same great ease and a belt may be shortened very rapidly.

These belt fasteners are suitable for all kinds of belts; leather, cotton or hemp belts, woven belts, india rubber belts, balata belts, camel hair belts and so on.

The belt fasteners are made of first quality steel wire, having a great resistance and a suitable thickness for the work to be done by the belts. The length of the branches and the intervals left between the latter are proportionate to the width and the thickness of said belts. Thus it will be easy to provide a series of numbers of fasteners which correspond to the requirements of the service.

The belt fasteners may be made of steel, iron, copper brass or any other metal, of round, square, half round and the like wires. They may be nickel plated, galvanized, tinned, painted or varnished as required.

The belt fastener viewed lengthwise is proportionate to the width and the thickness of the belt. It is composed of two distinct parts viz. a body 1 formed of a single length of highly resisting soft steel wire which is bent, shaped and twisted so as to show a succession of branches 2 having a suitable length and spaced suitably apart, so as to suit the nature, the strength and the thickness of the belts, which latter may be simple or double ones. Each of these branches 2 carries at its end a small loop or eye 3 the loops of all the branches being placed on the same straight line as shown by the drawing.

The second part of the belt fastener is a rod or pin 4 made of hard and rigid steel wire, which has a slightly larger diameter than the wire forming the body of the belt fastener. This pin 4 is adapted to pass easily through the loops 3 of the branches and serves to close the joint. One of the ends of the pin 4 is slightly pointed at 5 so as to allow its easy introduction into the small loops 3, while the opposite end of the pin is provided with a small hook 6 bent at right angles and also slightly pointed so as to be able to penetrate slightly into the belt when the latter is tensioned thus preventing the pin from leaving the loops 3. The opposite end of the pin is slightly flattened at about 90° to the hook and is adapted to pass through the loops when placed longitudinally with reference thereto; but when after the insertion of the pin the hook of the latter is rotated 90 degrees, the flattened end places itself crosswise with reference to the loops and thus prevents the pin from moving lengthwise and escaping from the loops.

When it is desired to unite the two ends of a belt 7, the ends of the parts to be connected are first trimmed square. Then the fastener is placed on the superposed ends of the belt and the holes to be made in these ends are marked on the belt opposite each of the fasteners and at a distance of about 5 to 8 millimeters from the edge of the ends. The holes are then pierced through both ends by means of a punch or an awl, care being taken that the holes correspond well to each other on both ends of the belt. The branches of the fastener are then introduced into the holes of the ends of the belt and finally the pin is passed through the loops as shown by Figs. 3 and 4 of the drawing.

Having now fully described my said invention, what I claim and desire to secure by Letters Patent, is:—

A belt fastener comprising a member provided with a plurality of projections each of said projections having an elongated opening at its outer end, and a pin having one end flattened and a hook at its opposite end, the flattened portion of the pin being at right angle to the hook, the said pin fitting in the openings in the projections and the flattened portion frictionally engaging the wall of one of the elongated openings and preventing the longitudinal movement of the pin.

In testimony whereof I have hereunto set my hand in presence of two witnesses.

EGIDE LOUIS VICTOR UHLENHUTH.

Witnesses:
H. C. COXE,
LÉSSIER UHLENHUTH.

Copies of this patent may be obtained for five cents each, by addressing the "Commissioner of Patents, Washington, D. C."